United States Patent
Tanaka et al.

(10) Patent No.: US 9,472,994 B2
(45) Date of Patent: Oct. 18, 2016

(54) ROTATING ELECTRIC MACHINE

(71) Applicant: Mitsubishi Electric Corporation, Tokyo (JP)

(72) Inventors: Kazunori Tanaka, Tokyo (JP); Kazuya Hasegawa, Tokyo (JP); Shintaro Shimizu, Tokyo (JP); Atsushi Oohashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/780,167

(22) PCT Filed: Jul. 5, 2013

(86) PCT No.: PCT/JP2013/068502
§ 371 (c)(1),
(2) Date: Sep. 25, 2015

(87) PCT Pub. No.: WO2015/001660
PCT Pub. Date: Jan. 8, 2015

(65) Prior Publication Data
US 2016/0056680 A1 Feb. 25, 2016

(51) Int. Cl.
*H02K 5/16* (2006.01)
*F16C 35/077* (2006.01)
(Continued)

(52) U.S. Cl.
CPC .............. *H02K 5/161* (2013.01); *F16C 19/525* (2013.01); *F16C 35/077* (2013.01); *H02K 5/02* (2013.01); *H02K 5/16* (2013.01); *F16C 2202/22* (2013.01)

(58) Field of Classification Search
CPC ........ H02K 5/16; H02K 5/173; F16C 27/06; F16C 35/077; F02N 15/02; F02N 11/00
See application file for complete search history.

(56) References Cited

U.S. PATENT DOCUMENTS 5,112,147 A * 5/1992 Imamura ............ G11B 19/2009
                                                    384/493
6,030,128 A * 2/2000 Pontzer ................... F16C 35/00
                                                    384/476
(Continued)

FOREIGN PATENT DOCUMENTS

JP         51-53145 A      5/1976
JP         1-123449 U      8/1989
(Continued)

OTHER PUBLICATIONS

International Search Report for PCT/JP2013/068502 dated Jul. 30, 2013.

*Primary Examiner* — Tran Nguyen
(74) *Attorney, Agent, or Firm* — Sughrue Mion, PLLC; Richard C. Turner

(57) ABSTRACT

The present invention provides an AC generator for a vehicle, in which a resin case (26) includes convex portions (33) formed on an outer circumferential surface of the resin case (26) so as to extend in an axial direction of the resin case (26) to be brought into pressure-contact with an inner circumferential wall surface of a counter drive-side bearing housing portion (24), and convex portions (34) formed on an inner circumferential surface of the resin case (26) so as to be opposed to the convex portions (33). The concave portions (34) allow displacement of the convex portions (33) in a radially inward direction of the resin case (26). By an elastic force generated by the displacement of the convex portions (33), the resin case (26) is integrated with the counter drive-side bearing housing portion (24).

16 Claims, 8 Drawing Sheets

(51) Int. Cl.
*F16C 19/52* (2006.01)
*H02K 5/02* (2006.01)

(56) References Cited

U.S. PATENT DOCUMENTS 8,851,759 B2 * 10/2014 Bussit .................... F16C 19/06
384/536
2014/0312727 A1 10/2014 Shinosaka
2014/0354097 A1 * 12/2014 Tanaka ................. H02K 5/1732
310/90
2015/0155754 A1 * 6/2015 Ohashi .................. H02K 5/161
310/90

FOREIGN PATENT DOCUMENTS

| | | |
|---|---|---|
| JP | 2001-165150 A | 6/2001 |
| JP | 2013-103696 A | 5/2013 |
| WO | 2013/121555 A1 | 8/2013 |
| WO | 2014/009998 A1 | 1/2014 |

* cited by examiner

ROTATING ELECTRIC MACHINE

CROSS REFERENCE TO RELATED APPLICATIONS

This application is a National Stage of International Application No. PCT/JP2013/068502 filed Jul. 5, 2013, the contents of all of which are incorporated herein by reference in their entirety.

TECHNICAL FIELD

The present invention relates to a rotating electric machine including a bearing for rotatably supporting a rotator, which is housed inside a bearing housing portion of a bracket, such as an AC generator for a vehicle to be mounted in a vehicle.

BACKGROUND ART

Hitherto, there has been known a rotating electric machine including a bracket and a clearance filling member. A bearing housing portion for housing a rolling bearing therein is integrally formed with the bracket. The clearance filling member is provided between an outer ring of the rolling bearing and the bearing housing portion, and is made of a material having a larger thermal expansion coefficient than that of the bracket (for example, see Patent Literature 1).

In the rotating electric machine, a cutout portion is formed on the clearance filling member so as to facilitate elastic deformation. At the same time, a projecting portion is formed on an outer circumference of the clearance filling member. The projecting portion is locked to a concave portion formed on an inner circumferential surface of the bearing housing portion to inhibit the rotation of the clearance filling member relative to the bearing housing portion.

CITATION LIST

Patent Literature

[PTL 1] JP 07-158647 A (paragraph 0028)

SUMMARY OF INVENTION

Technical Problem

In the rotating electric machine having the configuration described above, the cutout portion and the projecting portion are required to be formed on the clearance filling member in order to inhibit the rotation of the clearance filling member relative to the bearing housing portion and house the clearance filling member inside the bearing housing portion. Thus, the clearance filling member has a complex configuration. In addition, when the clearance filling member is mounted inside the bearing housing portion, the projecting portion is required to be locked to the concave portion formed on the inner circumferential surface of the bearing housing portion. Thus, there is a problem in that long time is disadvantageously required for alignment between the projecting portion and the concave portion.

Moreover, there is another problem described below. The projecting portion of the clearance filling member may be deformed and displaced inwardly when the projecting portion is locked to the concave portion of the bearing housing portion. Such deformation and displacement of the projecting portion adversely affect the outer ring of the bearing housed inside the bearing housing portion through an intermediation of the clearance filling member.

The present invention has been made to solve the problems described above, and therefore has an object to provide a rotating electric machine with a simple configuration, including a clearance filling member that can be easily assembled to a bearing housing portion without requiring time and can suppress an adverse effect on an outer ring of a bearing.

Solution to Problem

According to one embodiment of the present invention, there is provided a rotating electric machine, including:
a shaft;
a rotator fixed to the shaft;
bearings provided to the shaft on both sides of the rotator so as to be rotatable, for rotatably supporting the rotator; and
a bracket including a bearing housing portion, into which the bearing is press-fitted through a clearance filling member therebetween, in which:
the clearance filling member has a cylindrical shape with a thickness in a radial direction of the clearance filling member smaller than a clearance between an outer circumferential wall surface of an outer ring of the bearing and an inner circumferential wall surface of the bearing housing portion;
the clearance filling member includes:
a convex portion formed on an outer circumferential surface of the clearance filling member so as to extend in an axial direction of the clearance filling member to be brought into pressure-contact with the inner circumferential wall surface of the bearing housing portion; and
a concave portion formed on an inner circumferential surface of the clearance filling member so as to be opposed to the convex portion, for allowing displacement of the convex portion in a radially inward direction of the clearance filling member; and
the clearance filling member is integrated with the bearing housing portion by an elastic force generated by the displacement of the convex portion.

Advantageous Effects of Invention

According to the rotating electric machine of the one embodiment of the present invention, the clearance filling member includes the convex portion formed on the outer circumferential surface of the clearance filling member so as to extend in the axial direction of the clearance filling member to be brought into pressure-contact with the inner circumferential wall surface of the bearing housing portion, and the concave portion formed on the inner circumferential surface of the clearance filling member so as to be opposed to the convex portion, for allowing displacement of the convex portion in the radially inward direction of the clearance filling member. The clearance filling member is integrated with the bearing housing portion by the elastic force generated by the displacement of the convex portion.

Thus, the clearance filling member may have a simple configuration and may be easily assembled to the bearing housing portion without requiring time, and the adverse effect on the outer ring of the bearing may be suppressed.

DESCRIPTION OF EMBODIMENTS

Figure 1:
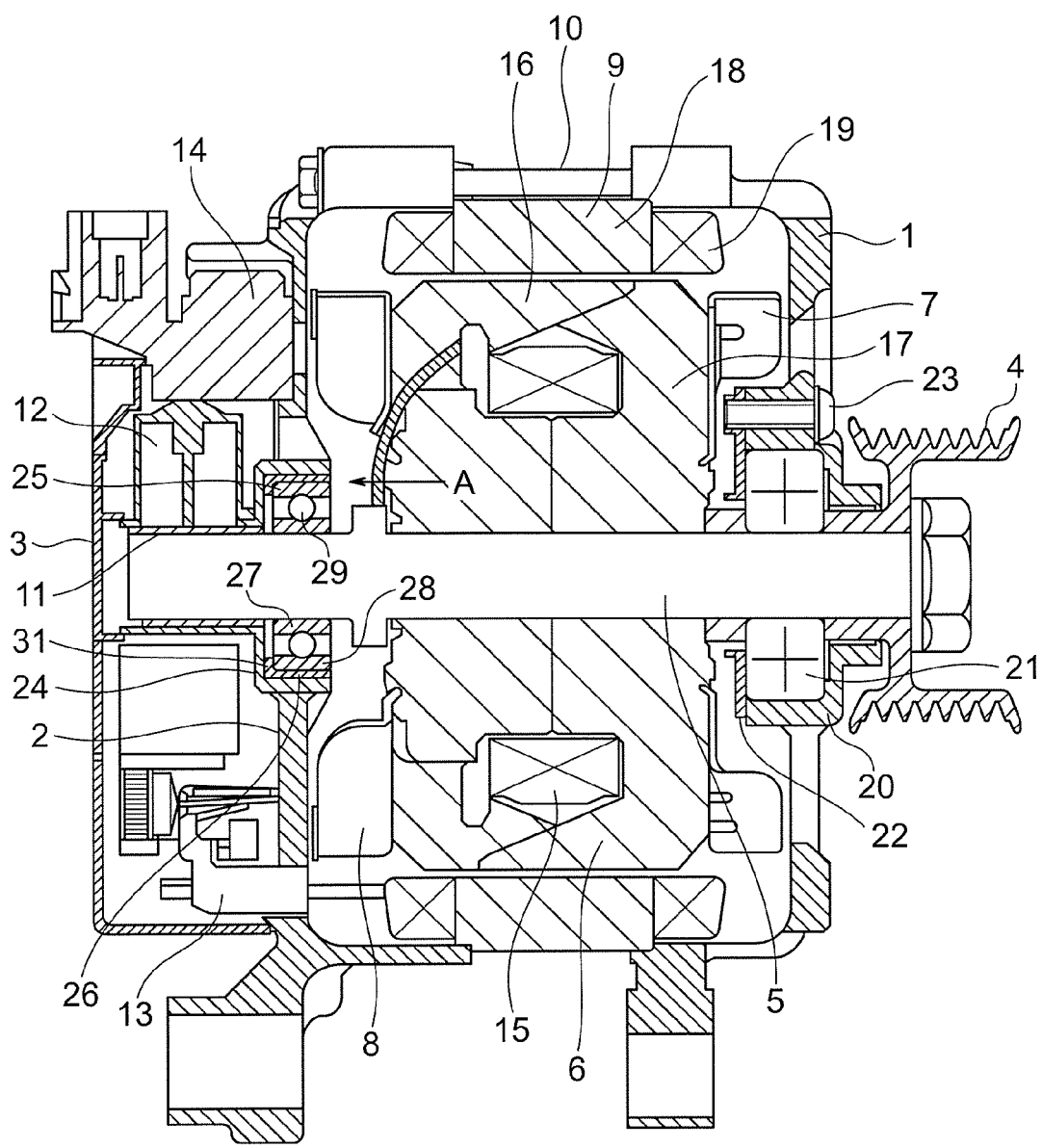
FIG. 1 is a sectional side view for illustrating an AC generator for a vehicle according to a first embodiment of the present invention.

Referring to the drawings, embodiments of the present invention are described below. In the drawings, the same or corresponding components and parts are denoted by the same reference symbols.

First Embodiment

Figure 2:
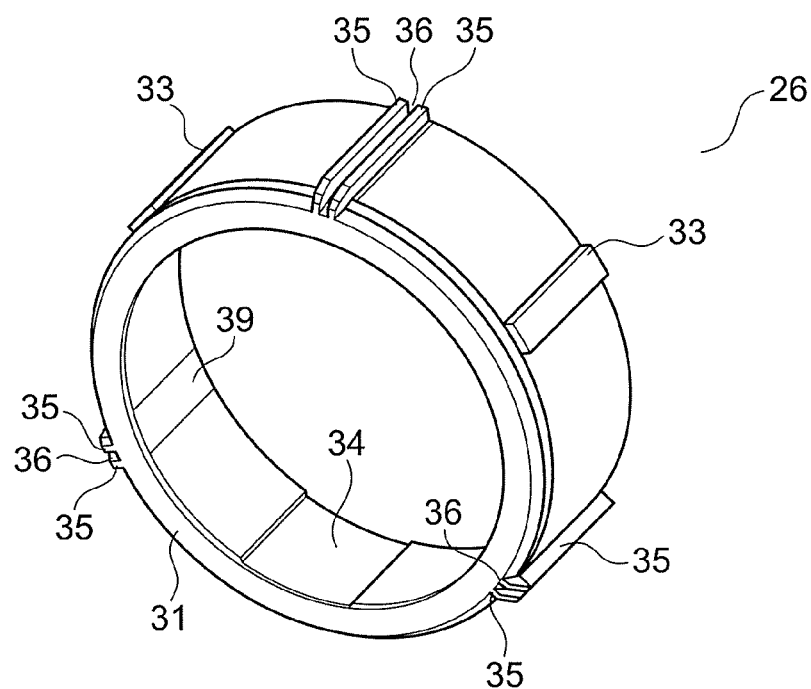
FIG. 2 is a perspective view for illustrating a resin case of FIG. 1.

FIG. 1 is a sectional side view for illustrating an AC generator for a vehicle according to a first embodiment of the present invention, and FIG. 2 is a perspective view for illustrating a resin case 26 of FIG. 1.

The AC generator for a vehicle is a rotating electric machine. The AC generator for a vehicle includes a casing, a resin cover 3, a shaft 5, a rotor 6, a drive-side fan 7, a counter drive-side fan 8, and a stator 9. The casing includes a drive-side bracket 1 and a counter drive-side bracket 2. Each of the drive-side bracket 1 and the counter drive-side bracket 2 has an approximately bowl-like shape, and is made of aluminum. The resin cover 3 partially covers the counter drive-side bracket 2. The shaft 5 is provided on a center axis line of the casing. On one end of the shaft 5, a pulley 4 is fixed. The shaft 5 passes through the rotor 6 that is arranged inside the casing. The drive-side fan 7 is mounted to a side surface of the rotor 6 on the drive-side bracket 1 side, whereas the counter drive-side fan 8 is mounted to a side surface of the rotor 6 on the counter drive-side bracket 2 side. The stator 9 is fixed to the casing so as to surround the rotor 6.

The stator 9 is fastened with a fastening force of a fastening bolt 10 from both sides by the drive-side bracket 1 and the counter drive-side bracket 2 so as to be interposed between the drive-side bracket 1 and the counter drive-side bracket 2.

The AC generator for a vehicle further includes a slip ring 11, a pair of brushes 12, a rectifier 13, and a voltage regulator 14. The slip ring 11 is mounted onto a portion of a surface of the shaft 5, which is located between the counter drive-side bracket 2 and the resin cover 3, and supplies a current to the rotor 6. The pair of brushes 12 slides against a surface of the slip ring 11. The rectifier 13 is electrically connected to the stator 9 so as to rectify an AC current generated in the stator 9 into a DC current. The voltage regulator 14 regulates an AC voltage generated in the stator 9.

The rotator 6 is a Lundell-type rotator. The rotator 6 includes a rotator coil 15, and a pair of claw-like magnetic poles 16 and 17. A magnetic flux is generated by the flow of an exciting current through the rotator coil 15. The claw-like magnetic poles 16 and 17 are provided so as to be opposed to each other to cover the rotator coil 15. By the magnetic flux generated by the rotator coil 15, magnetic poles are formed in the claw-like magnetic poles 16 and 17.

The stator 9 includes a stator core 18 and a stator coil 19. The stator core 18 has a cylindrical shape. The stator coil 19 is formed by winding a conductor in a slot (not shown) of the stator core 18. With the rotation of the rotator 6, AC power is excited in the stator coil 19 by a change in magnetic flux generated by the rotator coil 15.

The stator coil 19 includes two sets of three-phase AC windings, each being obtained by Y-connection of three winding portions (not shown).

A drive-side bearing housing portion 20 is formed in a center portion of the drive-side bracket 1. A drive-side bearing 21 that rotatably supports the shaft 5 is press-fitted into and housed within the drive-side bearing housing portion 20. The axially inward movement of the drive-side bearing 21 is inhibited by a retainer 22 that is fixed to the drive-side bracket 1 by a screw 23 so as to cover an opening portion of the drive-side bearing housing portion 20.

A counter drive-side bearing housing portion 24 is formed in the center portion of the counter drive-side bracket 2. A counter drive-side bearing 25 that rotatably supports the shaft 5 is mounted inside the counter drive-side bearing housing portion 24 through a resin case 26 having a cylindrical shape. The resin case 26 is a clearance filling member.

The counter drive-side bearing 25 includes an inner ring 27, an outer ring 28, and balls 29. The inner ring 27 is firmly fixed to the shaft 5. The balls 29 are provided between the outer ring 28 and the inner ring 27.

The resin case 26 fills a clearance between the counter drive-side bearing housing portion 24 and the outer ring 28 of the counter drive-side bearing 25 by thermal expansion. The clearance is generated by a difference in thermal expansion between the counter drive-side bearing housing portion 24 and the outer ring 28 of the counter drive-side bearing 25 due to heat generation at the time of driving.

Figure 3:
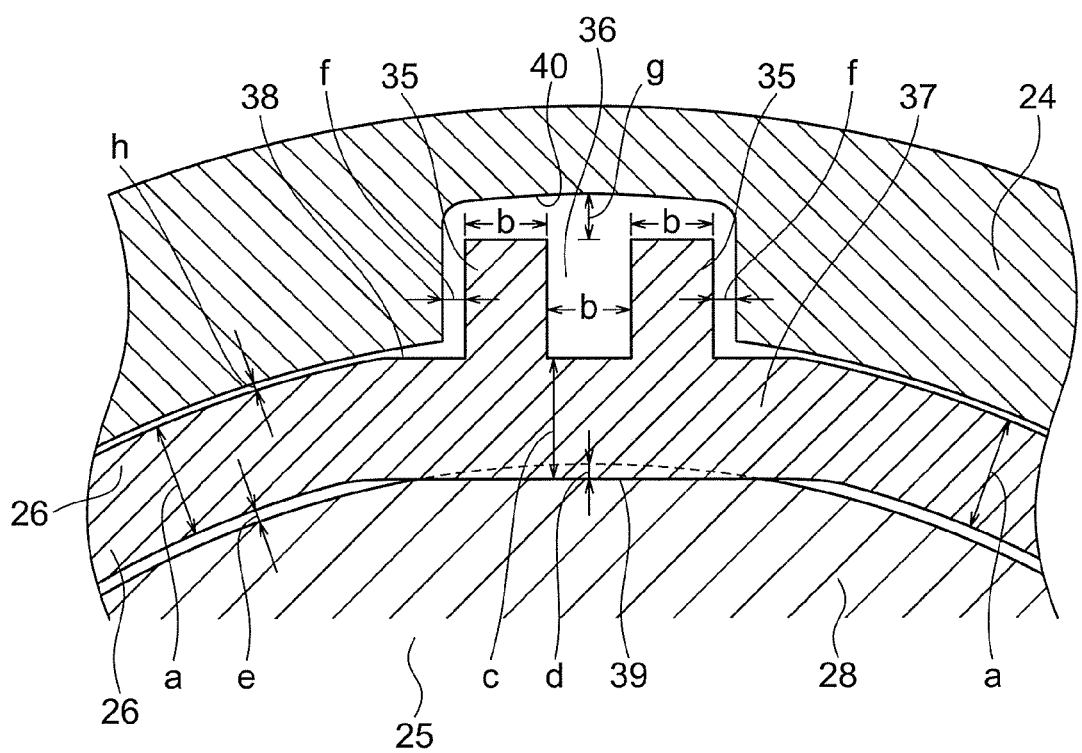
FIG. 3 is a partial front sectional view for illustrating the resin case mounted inside the counter drive-side bearing housing portion illustrated in FIG. 1.

FIG. 2 is a perspective view for illustrating the resin case 26 illustrated in FIG. 1, and FIG. 3 is a partial front sectional view for illustrating the resin case 26 mounted inside the counter drive-side bearing housing portion 24 illustrated in FIG. 1.

The resin case 26, which is a clearance filling member, has a cylindrical shape that extends over the entire axial length of the outer ring 28 of the counter drive-side bearing 25. The resin case 26 is made of a polybutyleneterephthalate (PBT) resin.

The resin case 26 has a cylindrical shape with a thickness a in a radial direction of the resin case 26, which is smaller than a clearance between an outer circumferential wall surface of the outer ring 28 of the counter drive-side bearing 25 and an inner circumferential wall surface of the counter drive-side bearing housing portion 24.

The resin case 26 includes convex portions 33 formed on an outer circumferential surface so as to extend continuously over the entire region in an axial direction of the resin case 26 to be brought into pressure-contact with the inner circumferential wall surface of the counter drive-side bearing housing portion 24, and concave portions 34 having a width dimension in a circumferential direction of the resin case 26 twice or more as large as a width dimension of the convex portions 33 in the circumferential direction of the resin case 26, which are formed on an inner circumferential surface so as to be opposed to the convex portions 33. The convex portions 33 are formed equiangularly at three positions.

Further, the resin case 26 includes a locking portion 31 projecting inward in the radial direction of the resin case 26, which is formed on an edge on a side opposed to the rotor 6. On the outer circumferential surface, pairs of ribs 35 extending over the entire region in the axial direction of the resin case 26 are formed.

The opposing ribs 35 of each pair are provided equiangularly at three positions on the outer circumferential surface of the resin case 26.

As illustrated in FIG. 3, a slit 36 is formed between the opposing ribs 35 of each pair. A width of each of the ribs 35 in the circumferential direction of the resin case 26 and a width of the slit 36 are substantially the same dimension b.

By the slits 36, the occurrence of a so-called shrinkage phenomenon is prevented. The shrinkage phenomenon occurs when a resin material, which is melted at a high temperature, is cooled and solidified. The slits 36 are provided so that the thickness a of the resin case 26 is uniformized to provide a stable function to the resin case 26.

Flat portions 37 are formed in respective parts of the resin case 26 between the ribs 35 of each pair and at the peripheries thereof. A thickness c between an outer circumferential surface 38 and an inner circumferential surface 39 of each of the flat portions 37 is the same as the thickness a of the resin case 26.

The inner circumferential surface 39 of the flat portion 37 has a chord-like shape formed by a line connecting two points on the inner circumferential surface of the resin case 26. The inner circumferential surface 39 is set so that a distance between the outer circumferential surface of the outer ring 28 and the inner circumferential surface 39 of the flat portion 37 has a dimension d (for example, 0.065 mm) so as to constantly press the outer circumferential surface of the outer ring 28 at normal temperature.

Moreover, a clearance e (for example, 0.025 mm) is formed between, except for the flat portions 37, the outer circumferential surface of the outer ring 28 and the inner circumferential surface of the resin case 26 at normal temperature.

The dimension d and the clearance e described above between the resin case 26 and the outer ring 28 are examples for keeping the inhibition of the rotation of the outer ring 28 about the shaft 5 by constantly pressing the outer circumferential surface of the outer ring 28 only by the inner circumferential surface 39 of the flat portion 37 even when a high-temperature state continues.

The ribs 35 provided on the outer circumferential surfaces 38 of the flat portions 37 are brought into engagement with engagement concave portions 40 formed on portions of the counter drive-side bearing housing portion 24, which are respectively opposed to the ribs 35 in the radial direction. As a result, the rotation of the resin case 26 about the shaft 5 relative to the counter drive-side bearing housing portion 24 is inhibited.

Note that, a clearance f between the rib 35 and the engagement concave portion 40 in the circumferential direction of the resin case 26 is, for example, 0.2 mm, whereas a clearance g between the rib 35 and the engagement concave portion 40 in the radial direction of the resin case 26 is, for example, 0.39 mm.

The above-mentioned examples of the dimensions are set values with which each of the ribs 35 does not abut against the inner circumferential wall surface of the engagement concave portion 40 of the counter drive-side bearing housing portion 24 even when the high-temperature state continues.

A dimension of a clearance h between, except for the outer circumferential surfaces 38 of the flat portions 37, the outer circumferential surface of the resin case 26 and the inner circumferential surface of the counter drive-side bearing housing portion 24 is, for example, 0.014 mm.

Figure 4:
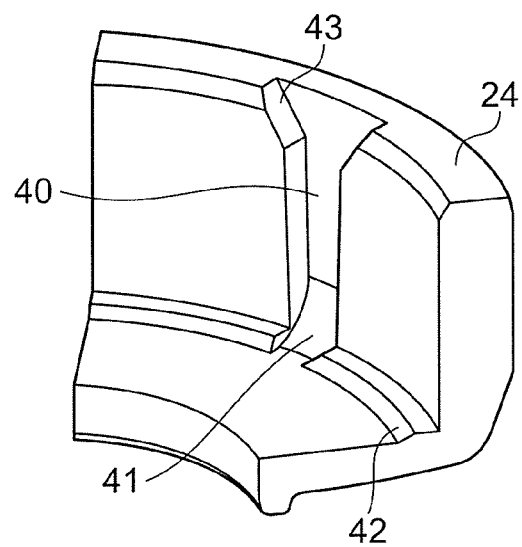
FIG. 4 is a perspective view for illustrating a principal part of the counter drive-side bearing housing portion.

FIG. 4 is a perspective view for illustrating a principal part of the counter drive-side bearing housing portion 24.

For each of the engagement concave portions 40 formed on the counter drive-side bearing housing portion 24, an abutment portion 41 and a level-difference portion 42 are provided. The abutment portion 41 is formed on a bottom surface side. Distal end surfaces of the ribs 35 abut against the abutment portion 41. The level-difference portions 42 are formed on the peripheries of the abutment portion 41.

The engagement concave portion 40 is formed to extend from the abutment portion 41 over the entire region in the axial direction of the counter drive-side bearing housing portion 24. At an inlet of the engagement concave portion 40, a tapered cutout portion 43 is formed as a guide for insertion of the ribs 35.

Figure 5:
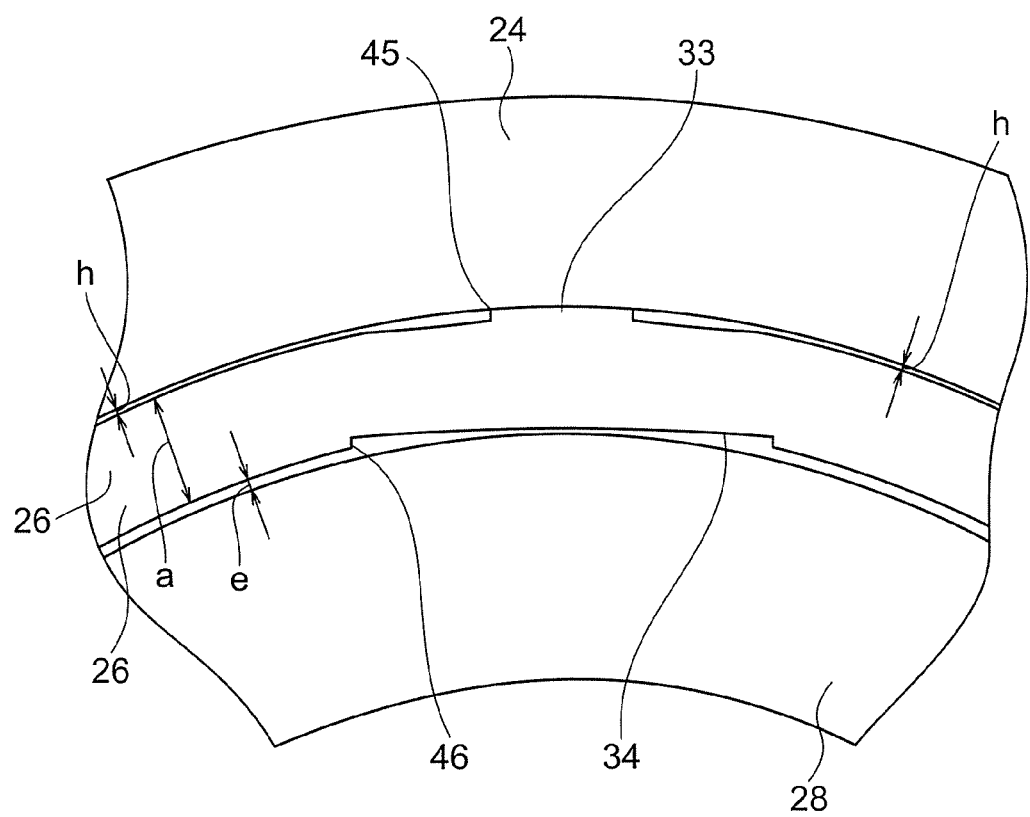
FIG. 5 is a partial front view of the counter drive-side bearing housing portion as viewed from a direction indicated by the arrow A in FIG. 1.

FIG. 5 is a partial front view of the counter drive-side bearing housing portion 24 as viewed from a direction indicated by the arrow A in FIG. 1.

The convex portions 33 press the inner circumferential surface of the counter drive-side bearing housing portion 24 at normal temperature as well as in the high-temperature state. In this manner, the convex portions 33 inhibit the rotation of the resin case 26 about the shaft 5 relative to the counter drive-side bearing housing portion 24.

The convex portions 33 are deformed by being press-fitted into the counter drive-side bearing housing portion 24, resulting in a certain amount of deformation of the inner circumferential surface to an inner circumferential side of the resin case 26. On the inner circumferential side surface, the concave portions 34 are formed. Therefore, the counter drive-side bearing 25 mounted inside of the resin case 26, in particular, the outer ring 28 thereof is not affected thereby.

The convex portions 33 have a configuration of constantly pressing the inner circumferential surface of the counter drive-side bearing housing portion 24 in contrast to the ribs 35 that do not abut against the inner circumferential surface of the counter drive-side bearing housing portion 24 even in a high-temperature state, and are formed to inhibit the rotation of the resin case 26 relative to the counter drive-side bearing housing portion 24. Although a length of each of the convex portions 33 in the circumferential direction of the resin case 26 is not so long, a full-width length is provided in the axial direction of the resin case 26 instead.

The inventors of the present invention have repeated trial manufacture in view of inhibition of the rotation of the resin case 26 relative to the counter drive-side bearing housing portion 24. As a result, the length of each of the convex portions 33 in the circumferential direction of the resin case 26, which has the full-width length in the axial direction of the resin case 26, is 2 mm as a suitable value in a case where an outer diameter of the counter drive-side bearing 25 is 35 mm.

Further, in this case, the concave portion 34 has a width (4 mm or longer) twice or more as large as the width of the convex portion 33 in the circumferential direction of the resin case 26.

The concave portions 34 have a depth that allows displacement of the convex portions 33 in the radially inward direction of the resin case 26. By the displacement of the convex portions 33 in the radially inward direction of the resin case 26, the resin case 26 has an elastic force generated therein and is integrated with the counter drive-side bearing housing portion 24 by the elastic force.

Specifically, the resin case 26 is held in the clearance between the outer circumferential wall surface of the outer ring 28 of the counter drive-side bearing 25 and the inner circumferential wall surface of the counter drive-side bearing housing portion 24 in a state of being integrated with the counter drive-side bearing 25 through the flat portions 37 and being integrated with the counter drive-side bearing housing portion 24 by an elastic mechanism formed by the pairs of the convex portions 33 and the concave portions 34.

Figure 6:
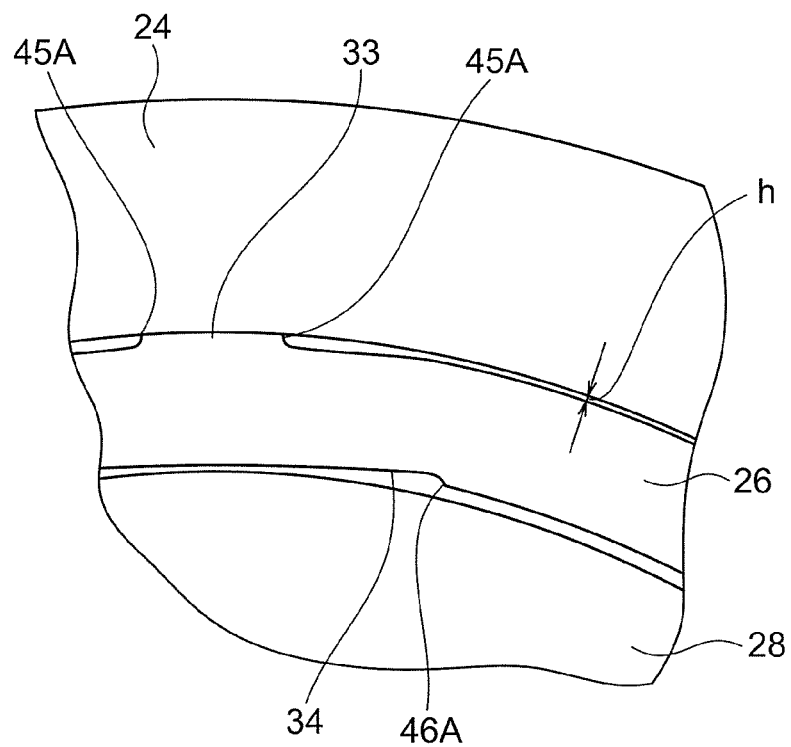
FIG. 6 is a modification of a resin case in FIG. 2, and a partial front view of the counter drive-side bearing housing portion as viewed from a direction indicated by the arrow A in FIG. 1.

Each of corner portions 45 at the bottom of the convex portions 33 and corner portions 46 on bottom surface portions of the concave portions has a right-angled shape. By rounding performed to form corner portions 45A and 46A, each having a curved shaped as illustrated in FIG. 6, an elastic function provided by the convex portions 33 and the concave portions 34 in pairs can be further enhanced.

In the rotating electric machine having the configuration described above, a current is supplied from a battery (not shown) through the brushes 12 and the slip ring 11 to the rotator coil 15 of the rotator 6 to generate a magnetic flux. As a result, the N-pole is generated in the claw-like magnetic pole 16 of the rotator 6, whereas the S-pole is generated in the claw-like magnetic pole 17 of the rotator 6.

On the other hand, the pulley 4 is driven by an engine. The rotator 6 is rotated by the shaft 5 to apply a rotating magnetic field to the stator core 18. As a result, an electromotive force is generated in the stator coil 19.

The magnitude of the AC electromotive force is regulated by the voltage regulator 14 for regulating the current flowing through the rotator coil 15.

An AC current generated by the AC electromotive force passes through the rectifier 13 to be rectified into a DC current that in turn charges the battery.

Incidentally, the counter drive-side bearing 25 is housed inside the counter drive-side bearing housing portion 24 of the counter drive-side bracket 2 on which the rectifier 13 and the voltage regulator 14 corresponding to heat-generating components are provided.

Therefore, the heat generated from the heat-generating components is transferred to the counter drive-side bearing 25 through the counter drive-side bearing housing portion 24 on the counter drive-side. Moreover, the heat generated from the rotator coil 15 is transferred to the shaft 5 through the claw-like magnetic poles 16 and 17, and is then transferred to the outer ring 28 of the counter drive-side bearing 25. As a result, the counter drive-side bearing housing portion 24, the resin case 26, and the outer ring 28 of the counter drive-side bearing 25 thermally expand.

In this case, the counter drive-side bearing housing portion 24 is made of aluminum, whereas the outer ring 28 of the counter drive-side bearing 25 is made of carbon steel. Therefore, the above-mentioned components thermally expand in such a way that the clearance between the counter drive-side bearing housing portion 24 and the outer ring 28 of the counter drive-side bearing 25 is increased.

On the other hand, because of its large linear expansion coefficient, the resin case 26, which is the clearance filling member, thermally expands to fill the clearance between the counter drive-side bearing housing portion 24 and the outer ring 28 of the counter drive-side bearing 25. Therefore, a coupling force between the counter drive-side bearing housing portion 24 and the outer ring 28 of the counter drive-side bearing 25 through the resin case 26 is ensured.

Specifically, even when the inner circumferential surfaces 39 of the flat portions 37 of the resin case 26 are subjected to the heat from the heat-generating components to be placed in the high-temperature state, the inner circumferential surfaces 39 continue pressing the outer ring 28 at all the positions (three positions in this embodiment) of the resin case 26. Therefore, the rotation of the resin case 26 and the outer ring 28 relative to each other does not occur.

Moreover, the ribs 35 provided on the resin case 26 also thermally expand at the high temperature both in the radial direction and the circumferential direction of the resin case 26. The dimensions of the clearance f and the clearance g are ensured so that the ribs 35 are not brought into pressure-contact with the inner wall surfaces of the engagement concave portions 40 of the counter drive-side bearing housing portion 24.

That is, each of the ribs 35 faces the inner wall surface of the engagement concave portion 40 of the counter drive-side bearing housing portion 24 through a predetermined extremely small clearance therebetween.

As a result, when the resin case 26 moves in a rotating direction of the shaft 5 during the rotation of the shaft 5, the ribs 35 of the resin case 26 abut against radially inner surfaces of the engagement concave portions 40, which are on an opposed side in the rotating direction of the shaft 5, to inhibit the rotation of the resin case 26 relative to the counter drive-side bearing housing portion 24.

The convex portions 33 formed on the outer circumferential surface of the resin case 26 press the inner circumferential surface of the counter drive-side bearing housing portion 24 at normal temperature as well as at high temperature. Therefore, the rotation of the resin case 26 about the shaft 5 relative to the counter drive-side bearing housing portion 24 is inhibited. However, even when the resin case 26 is going to rotate, the rotation of the resin case 26 can be reliably inhibited by the ribs 35 loosely inserted into the engagement concave portions 40.

According to the AC generator for a vehicle in this embodiment, the resin case 26 includes the convex portions 33 formed on the outer circumferential surface so as to extend in the axial direction of the resin case 26 to be brought into pressure-contact with the inner circumferential wall surface of the counter drive-side bearing housing portion 24, and the concave portions 34 formed on the inner circumferential surface so as to be opposed to the convex portions 33 and to allow the displacement of the convex portions 33 in the radially inward direction of the resin case 26. The resin case 26 is integrated with the counter drive-side bearing housing portion 24 by the elastic force generated by the displacement of the convex portions 33.

Therefore, the resin case 26 has a simple configuration and can be easily assembled into the counter drive-side bearing housing portion 24 without requiring time.

Further, the convex portions 33 and the concave portions 34 of the resin case 26 that is inserted into the counter drive-side bearing housing portion 24 are deformed and displaced in the radially inward direction of the resin case 26. By the elastic deformation generated thereby, the rotation of the resin case 26 relative to the counter drive-side bearing housing portion 24 is inhibited. Therefore, the rotation of the resin case 26 relative to the counter drive-side bearing housing portion 24 can be inhibited with a simple configuration.

In addition, the above-mentioned deformation and displacement of the resin case 26 are absorbed in the spaces inside the concave portions 34. Thus, the outer ring 28 is not adversely affected by the deformation and displacement. As a result, reliability of the AC generator for a vehicle is improved.

Further, the convex portions 33 and the concave portions 34 are formed so as to continuously extend over the entire region in the axial direction of the resin case 26. Therefore, the resin case 26 is impartially brought into pressure-contact in the axial direction of the resin case 26, and is therefore stably integrated with the counter drive-side bearing housing portion 24.

Moreover, the three convex portions 33 are formed equiangularly. Therefore, the convex portions 33 provided on the resin case 26 are impartially brought into pressure-contact with the inner circumferential wall surface of the counter drive-side bearing housing portion 24 in the circumferential direction of the resin case 26. Therefore, the resin case 26 is stably integrated with the counter drive-side bearing housing portion 24.

Further, the concave portion 34 has the width dimension that is twice or more as large as the width dimension of the convex portion 33. Therefore, the elastic function of the resin case 26 is increased to allow the displacement of the convex portions 33 and the concave portions 34 in the radially inward direction of the resin case 26 with a small force. As a result, the resin case 26 is easily inserted into and mounted inside the counter drive-side bearing housing portion 24.

Further, the concave portions 34 are separated away from the outer ring 28 when the counter drive-side bearing 25 is inserted into the resin case 26 mounted inside the counter drive-side bearing housing portion 24, and hence smooth insertion can be performed. As a result, the outer ring 28 is not excessively pressurized or the like during an insertion step for the counter drive-side bearing 25.

Moreover, the resin case 26 includes the flat portions 37 having the flat inner circumferential surfaces 39, which press the outer ring 28. Therefore, the rotation of the resin case 26 and the outer ring 28 relative to each other is inhibited with a simple configuration.

Further, each of the flat inner circumferential surfaces 39 of the flat portions 37 has the chord-like shape formed with the line connecting two points on the inner circumferential surface of the resin case 26, and therefore can be easily formed.

Moreover, the flat portions 37 are formed equiangularly at three positions. Therefore, the rotation of the resin case 26 and the outer ring 28 relative to each other can be more reliably inhibited.

Further, the ribs 35, which project in the radial direction of the resin case 26 and are held in engagement with the engagement concave portions 40 formed on the counter drive-side bearing housing portion 24, are provided on the flat portions 37 of the resin case 26. Therefore, the rotation of the resin case 26 relative to the counter drive-side bearing housing portion 24 can be more reliably inhibited with a simple configuration.

Moreover, the ribs 35 are formed in pairs so that the ribs 35 of each pair are opposed to each other through the slit 36 therebetween in the circumferential direction of the resin case 26. Therefore, the occurrence of a so-called shrinkage phenomenon, which occurs when the resin material melted at a high temperature is cooled and solidified, is prevented. Therefore, the thickness a of the case body can be uniformized.

Further, the ribs 35 are separated away from the inner wall surfaces of the engagement concave portions 40, and abut against the radially inner surfaces of the engagement concave portions 40 only when the resin case 26 moves as needed. Therefore, the rotation of the resin case 26 can be reliably inhibited.

Second Embodiment

Figure 7:
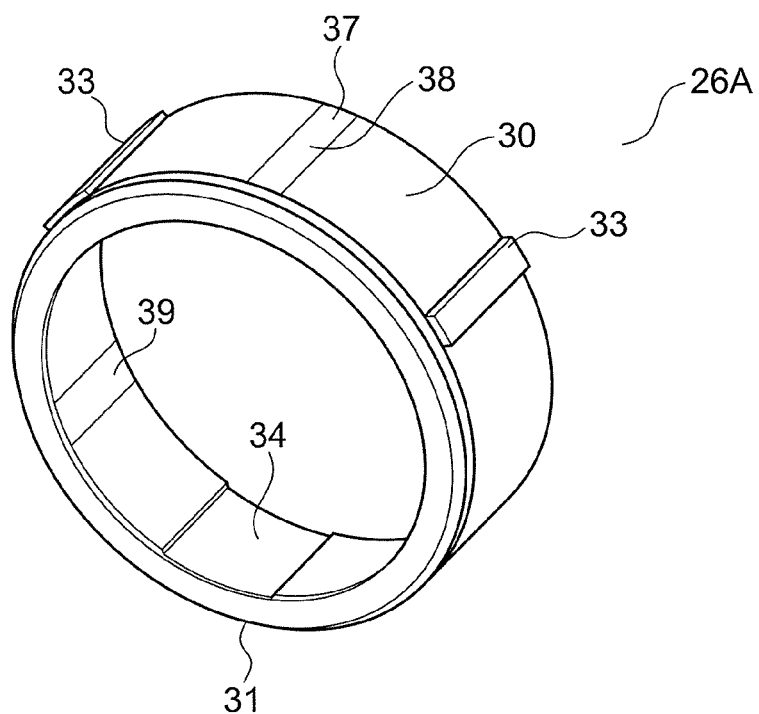
FIG. 7 is a perspective view for illustrating a resin case incorporated into an AC generator for a vehicle according to a second embodiment of the present invention.

FIG. 7 is a perspective view for illustrating a resin case 26A incorporated into an AC generator for a vehicle according to a second embodiment of the present invention.

In this embodiment, the ribs 35 of the AC generator for a vehicle according to the first embodiment are eliminated.

The remaining configuration is the same as that of the AC generator for a vehicle according to the first embodiment.

Although the ribs 35 are not formed in this embodiment, the convex portions 33 constantly press the inner circumferential surface of the counter drive-side bearing housing portion 24. As a result, the resin case 26A is integrated with the counter drive-side bearing housing portion 24, and the rotation of the resin case 26A about the shaft 5 relative to the counter drive-side bearing housing portion 24 is inhibited.

The inhibition of the rotation of the resin case 26A relative to the counter drive-side bearing housing portion 24 through the convex portions 33 alone is made possible by adjusting thicknesses of the convex portions 33 in the axial direction, the circumferential direction, and the radial direction of the resin case 26A.

With the AC generator for a vehicle according to this embodiment, the same effects as those obtained by the first embodiment can be obtained. In addition, in comparison with the resin case 26 of the first embodiment, a molding die for the resin case 26 is simplified to reduce the material to be used so as to reduce manufacturing cost because of the absence of the ribs 35.

Further, the ribs 35 are not formed. Therefore, when the resin case 26A is inserted into the counter drive-side bearing housing portion 24, positioning of the resin case 26A in the circumferential direction of the resin case 26A with respect to the counter drive-side bearing housing portion 24 is not required. Therefore, the resin case 26A can be easily mounted inside the counter drive-side bearing housing portion 24 without requiring time.

Third Embodiment

Figure 8:
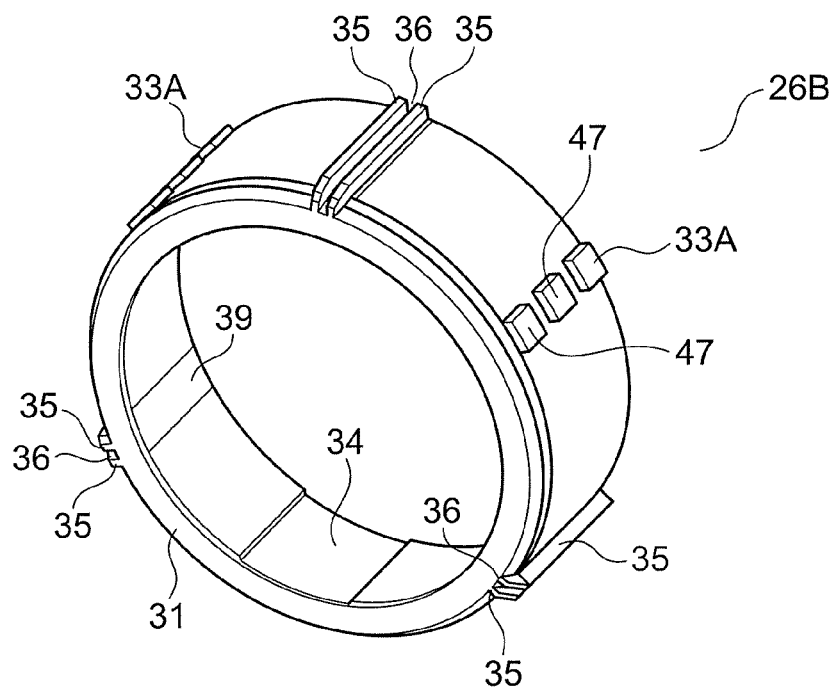
FIG. 8 is a perspective view for illustrating a resin case incorporated into an AC generator for a vehicle according to a third embodiment of the present invention.

FIG. 8 is a perspective view for illustrating a resin case 26B incorporated into an AC generator for a vehicle according to a third embodiment of the present invention.

In this embodiment, each convex portion 33A includes a plurality of projecting portions 47 arranged intermittently in a row in an axial direction of the resin case 26B.

The remaining configuration is the same as that of the AC generator for a vehicle according to the first embodiment.

Each of the convex portions 33 of the first embodiment is formed so as to continuously extend in the axial direction of the resin case 26, whereas each of the convex portions 33A includes the plurality of projecting portions 47 in this embodiment. Although a substantial length of the convex portion 33A in the axial direction of the resin case 26B is shorter than that of the convex portion 33 of the first embodiment, the same effects as those obtained by the AC generator for a vehicle according to the first embodiment can be obtained by increasing a length of the convex portion 33A in a circumferential direction of the resin case 26B to cover a shortage in length.

Although the width dimension of each of the concave portions 34 is twice or more as large as the width dimension of each of the convex portions 33, 33A in the resin case 26, 26A, 26B in each of the embodiments described above, the width dimension of each of the concave portions 34 is not necessarily required to be twice or more and may be any width dimension as long as the displacement of the convex portions 33, 33A in the radially inward direction of the resin case 26, 26A, 26B is allowed and the resin case 26, 26A, 26B can be integrated with the counter drive-side bearing housing portion 24 by the elastic force generated by the displacement.

Further, the length of each of the convex portions 33, 33A in the axial direction of the resin case 26, 26A, 26B is not necessarily required to extend over the entire region of the resin case 26, 26A, 26B.

Further, the number of convex portions 33, 33A and the number of ribs 35 are merely examples, and the numbers thereof are not limited thereto.

Further, the ribs 35 are not necessarily required to be formed on the flat portions 37, and are not required to be opposed to each other through the slit 36 therebetween. Further, the ribs 35 are not required to be formed so as to extend over the entire region of the resin case 26, 26A, 26B in the axial direction of the resin case 26, 26A, 26B, and may have a short axial length or may be discontinuous.

Although the AC generator for a vehicle has been described as the rotating electric machine in each of the embodiments described above, the AC generator for a vehicle is merely an example. The rotating electric machine may also be an AC generator mounted to other devices than a vehicle, or may be an electric motor.

Moreover, the examples where the resin case 26, 26A, 26B is provided on only one side of the shaft 5 as the clearance filling member for filling, by thermal expansion, the clearance between the bearing housing portion and the outer ring of the bearing have been described. However, the clearance filling members may be provided on both sides of the shaft.

REFERENCE SIGNS LIST 1 drive-side bracket, 2 counter drive-side bracket, 3 resin cover, 4 pulley, 5 shaft, 6 rotator, 7 drive-side fan, 8 counter drive-side fan, 9 stator, 10 fastening bolt, 11 slip ring, 12 brush, 13 rectifier, 14 voltage regulator, 15 rotator coil, 16, 17 claw-like magnetic pole, 18 stator core, 19 stator coil, 20 drive-side bearing housing portion, 21 drive-side bearing, 22 retainer, 23 screw, 24 counter drive-side bearing housing portion, 25 counter drive-side bearing, 26, 26A, 26B resin case (clearance filling member), 27 inner ring, 28 outer ring, 29 ball, 31 locking portion, 33, 33A convex portion, 34 concave portion, 35 rib, 36 slit, 37 flat portion, 38 outer circumferential surface, 39 inner circumferential surface, 40 engagement concave portion, 41 abutment portion, 42 level-difference portion, 43 cutout portion, 45, 45A, 46, 46A corner portion, 47 projecting portion, a, c thickness, b, d dimension, e, f, g clearance

The invention claimed is:

1. A rotating electric machine, comprising:
    a shaft;
    a rotator fixed to the shaft;
    bearings provided to the shaft on both sides of the rotator so as to be rotatable, for rotatably supporting the rotator; and
    a bracket including a bearing housing portion, into which the bearing is press-fitted through a clearance filling member therebetween, wherein:
    the clearance filling member has a cylindrical shape with a thickness in a radial direction of the clearance filling member smaller than a clearance between an outer circumferential wall surface of an outer ring of the bearing and an inner circumferential wall surface of the bearing housing portion;
    the clearance filling member comprises:
        a convex portion formed on an outer circumferential surface of the clearance filling member so as to extend in an axial direction of the clearance filling member to be brought into pressure-contact with the inner circumferential wall surface of the bearing housing portion; and
        a concave portion formed on an inner circumferential surface of the clearance filling member so as to be opposed to the convex portion, for allowing displacement of the convex portion in a radially inward direction of the clearance filling member; and
    the clearance filling member is integrated with the bearing housing portion by an elastic force generated by the displacement of the convex portion.

2. A rotating electric machine according to claim 1, wherein the convex portion is formed so as to continuously extend over an entire region of the clearance filling member in the axial direction of the clearance filling member.

3. A rotating electric machine according to claim 1, wherein the convex portion comprises a plurality of projecting portions intermittently arranged in a row.

4. A rotating electric machine according to claim 1, wherein a plurality of the convex portions are formed equiangularly.

5. A rotating electric machine according to claim 1, wherein a width dimension of the concave portion in a circumferential direction of the clearance filling member is twice or more as large as a width dimension of the convex portion in the circumferential direction of the clearance filling member.

6. A rotating electric machine according to claim 1, wherein the concave portion is separated away from the outer ring when the bearing is inserted into the clearance filling member mounted inside the bearing housing portion.

7. A rotating electric machine according to claim 1, wherein the clearance filling member comprises at least one flat portion having a flat inner circumferential surface, for pressing the outer ring.

8. A rotating electric machine according to claim 7, wherein the flat inner circumferential surface of the flat portion has a chord-like shape formed by a line connecting two points on the inner circumferential surface of the clearance filling member.

9. A rotating electric machine according to claim 7, wherein a plurality of the flat portions are formed equiangularly.

10. A rotating electric machine according to claim 7, wherein the clearance filling member comprises a rib projecting in the radial direction of the clearance filling member, the rib being provided on the flat portion to be engaged with an engagement concave portion formed on the bearing housing portion.

11. A rotating electric machine according to claim 10, wherein a pair of the ribs is formed so that the ribs are opposed to each other through a slit therebetween in the circumferential direction of the clearance filling member.

12. A rotating electric machine according to claim 10, wherein the rib is separated away from an inner wall surface of the engagement concave portion.

13. A rotating electric machine according to claim 1, wherein at least one of corner portions at a bottom of the convex portion and corner portions on a bottom surface portion of the concave portion are rounded to have curved surfaces.

14. A rotating electric machine according to claim 1, wherein the clearance filling member comprises a resin case.

15. A rotating electric machine according to claim 1, wherein the rotating electric machine comprises an AC generator for a vehicle.

16. A rotating electric machine according to claim 15, wherein the bearing comprises a counter drive-side bearing for rotatably supporting the shaft (5) on a side opposite to a pulley fixed to an end of the shaft and to be driven by an engine.

* * * * *